April 18, 1933. L. LE R. RHODES 1,904,387
COUPLING
Filed March 30, 1932
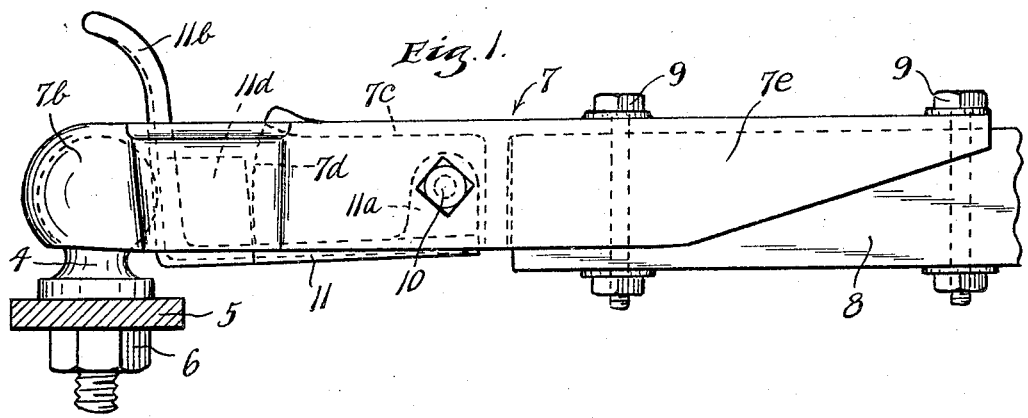
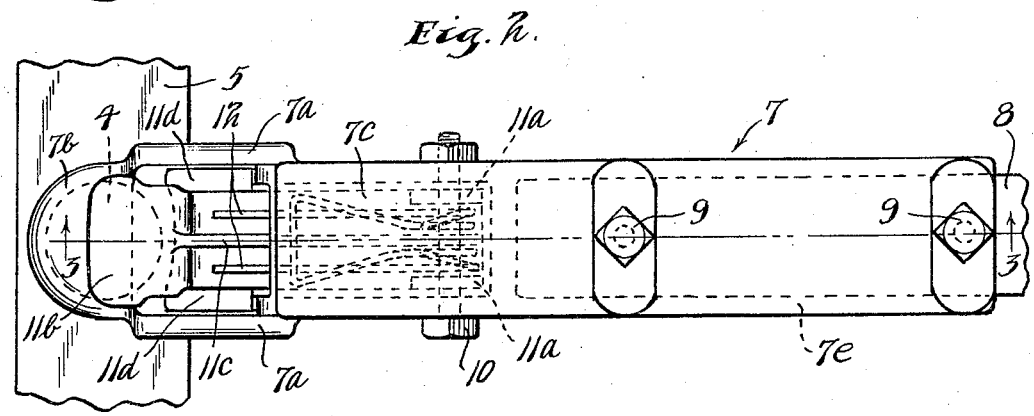
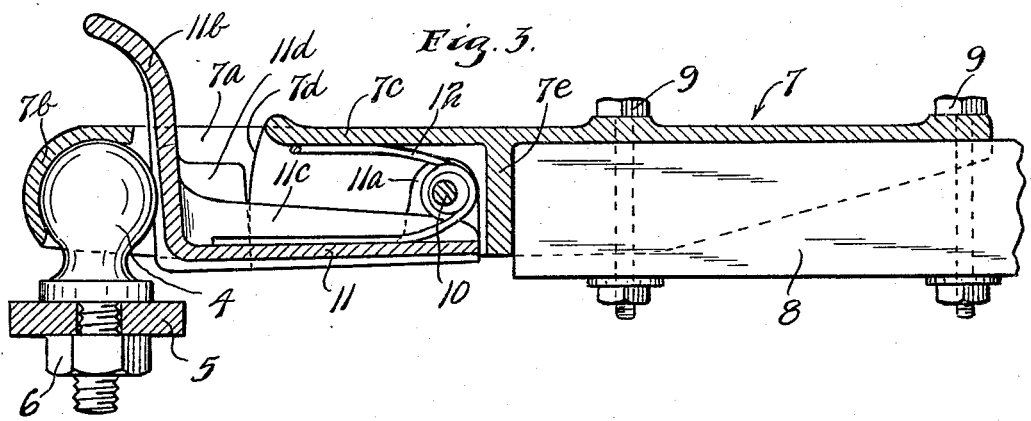
INVENTOR.
LEON LEROY RHODES
BY HIS ATTORNEYS.
Williamson & Williamson Patented Apr. 18, 1933

1,904,387

UNITED STATES PATENT OFFICE

LEON LE ROY RHODES, OF MINNEAPOLIS, MINNESOTA

COUPLING

Application filed March 30, 1932. Serial No. 601,987.

This invention relates to couplings for connecting draft vehicles, such as trailers, to lead vehicles, such as automobiles.

It is the main object of the invention to provide certain improvements in that class of couplings of the type disclosed in the Milton D. Brice and Alfred L. Brice Patent No. 1,147,844, issued July 27, 1915, and also disclosed in Milton D. Brice and Alfred L. Brice Patent No. 1,254,199, issued January 22, 1918, both of said patents being entitled "Pole coupling".

Said couplings each include a ball adapted to be attached to one vehicle, as the lead vehicle, and a U-shaped socket member adapted to be attached to another vehicle as a trailer vehicle. The U-shaped socket member forms between its sides or prongs a concave socket adapted to engage one side of the ball. There is pivotally mounted between the prongs of the socket member a spring pressed dog having an inclined surface which projects upwardly between the prongs and is adapted to engage the opposite side of the ball from the socket to retain the ball in place within the socket. Difficulty has been experienced with this type of coupling due to the fact that as the lead vehicle is backed up, the entire draft weight of the lead vehicle must be borne by the dog and the pivot upon which the dog is mounted. If, in backing, the draft vehicle happens to strike an obstruction such as a curb or the like, the dog or the pivot carrying the dog is likely to be bent or sprung to space the inclined surface of the dog normally bearing against the ball farther from the socket of the socket member than the diameter of the ball, whereupon during travel the ball is likely to become disengaged from the socket member to release the trailer vehicle from the draft vehicle. It is, therefore, highly desirable to prevent the dog or the pivot upon which the dog is mounted from being bent or sprung, and it is the main object of this invention to provide means in such a coupling for accomplishing these ends.

The objects and advantages of the present invention will more fully appear from the following description, made in connection with the accompanying drawing, wherein like reference characters refer to the same or similar parts throughout the various views, and, in which, Fig. 1 is a view in side elevation illustrating a coupling embodying the invention;

Fig. 2 is a plan view of the same; and

Fig. 3 is a longitudinal section taken substantially on the line 3—3 of Fig. 2, as indicated by the arrows.

Referring to the drawing, the coupling includes a ball 4 having a downwardly projecting stem adapted to run through an opening in a bar 5, or other suitable bracket, preferably attached to the lead vehicle. A nut 6 threaded on the stem of the ball may be used for clamping the ball 4 to the bar 5. The coupling also includes a substantially U-shaped socket member 7 having side prongs 7a and a concave socket 7b at its forward end between the side prongs 7a. The rear ends of the prongs 7a are interconnected by a housing 7e within which the forward end of a pole 8 secured as to the trailer vehicle, may fit. Nutted bolts 9 may be used for attaching the pole 8 to the housing 7b. The socket 7b is adapted to fit one side of the ball 4 as illustrated and it is also adapted to overlie part of the upper portion of the ball 4. Projecting forwardly from the housing 7e and interconnecting the upper edges of the prongs 7a of the socket member is an upper web or wall 7c. Forwardly projecting internal shoulders 7d are formed by the side prongs 7a in rearwardly spaced relation from the position of the ball 4 and these shoulders are preferably of arcuate contour. A pivot bolt 10 is mounted in the socket member 7 adjacent housing 7e and this pivot bolt extends between the side prongs 7a and has pivotally mounted thereon a dog 11. This dog has upwardly extending ears 11a adjacent its rear end through which the pivot bolt 10 extends and the dog has a normally substantially horizontally extending bottom surface which joins a forward upwardly extending oblique surface 11b having a concavity therein to bear against the opposite side of the ball 4 from the side against which the socket 7b bears. The surface 11b terminates at its upper end in a forwardly projecting lip or handle by means of which the dog can be raised to permit the socket member 7 being disconnected from the ball 4. Preferably, the dog 11 will be provided with a vertical central rib 11c to strengthen the same. For cooperating with the shoulders 7d, the dog 11 is provided with a pair of vertical side wings 11d which are located immediately forward from the shoulders 7d and are adapted at times to engage these shoulders. A suitable spring 12 extending about the pivot bolt 10 bears against the upper wall 7c and against the bottom of the dog 11 to normally urge the free end of the dog downwardly to bring the surface 11b into contact with the ball.

Attachment and detachment of the ball 4 to and from the socket member 7 will be readily understood. The dog 11 will, of course, hold the ball 4 in place to prevent disengagement of the same from the socket 7b when the ball 4 and socket member 7 are connected. The side wings 11d cooperating with the shoulders 7d on the prongs of the socket member 7, will prevent sufficient strain being placed upon the dog 11 to distort or spring the same or to distort or spring the pivot bolt 10 as the lead and trailer vehicles are backed up or as the trailer vehicle strikes an obstruction while being backed up. The rear edges of the side wings 11d will strike the shoulders 7d to relieve the strain that would otherwise be imposed upon the dog 11 and the pivot bolt 10. The dog, accordingly, cannot be sprung to such an extent as to widen the spacing between the socket 7b and the surface 11b of the dog and it will thus be impossible for the ball 4 to become disconnected from the socket member 7 unless the dog 11 is intentionally normally raised against the tension of the spring 12.

The coupling of the invention has been successfully demonstrated in actual practice.

It will, of course, be understood that various changes may be made in the form, details, arrangement and proportion of the parts without departing from the scope of the present invention, which, generally stated, consists in the matter shown and described and set forth in the appended claims.

What is claimed is:—

1. In a coupler, the combination with a ball, of an approximately U-shaped socket member having a socket engaging one side of said ball, a ball clamping dog located between the prongs of said socket member and pivoted thereto for engagement with the opposite side of said ball, the prongs of said socket member having shoulders integrally formed thereon and said dog having integral wings at its sides closely adjacent said shoulders for engagement therewith.

2. In a coupler, the combination with a ball, of an approximately U-shaped socket member having a socket engaging one side of said ball, a ball clamping dog located between the prongs of said socket member and pivoted thereto, the said dog at its free end having an oblique upwardly extending surface adapted to engage the opposite side of said ball, the prongs of said socket having internal shoulders formed integrally thereon and said dog having integral side wings terminating adjacent said shoulders for engagement therewith.

3. In a coupler, the combination of a ball, a substantially U-shaped socket member having a socket engaging one side of the ball, a ball clamping dog located between the prongs of said socket member and pivoted thereto, the said dog at its free end having an oblique upwardly extending surface adapted to engage the other side of said ball, a spring urging said dog into engagement with said ball, the prongs of said socket having integral internal shoulders and said dog having integral side flanges terminating adjacent said shoulders and adapted to engage with said shoulders.

4. The structure defined in claim 3, said shoulders being arcuately curved relative to the pivot for said dog.

5. In a coupler, the combination of a ball, a substantially U-shaped socket member having a socket engaging one side of the ball, a ball clamping dog located between the prongs of said socket member and pivoted thereto, said dog at its free end having an oblique upwardly extending surface adapted to engage the other side of said ball, a spring urging said dog into engagement with said ball, said dog having a rearwardly facing surface thereon, and said socket member having a forwardly facing surface thereon, said surfaces being arranged to abut each other to prevent the imposition of rearward pressure upon the medial and rearward portions of said dog.

In testimony whereof I affix my signature.

LEON LE ROY RHODES.